United States Patent
Hayes

(10) Patent No.: US 7,832,280 B2
(45) Date of Patent: Nov. 16, 2010

(54) METHOD AND APPARATUS FOR TESTING LOAD-BEARING CAPACITY UTILIZING A RING CELL

(75) Inventor: John A. Hayes, Gainesville, FL (US)

(73) Assignee: Loadtest, Inc., Gainesville, FL (US)

( * ) Notice: Subject to any disclaimer, the term of this patent is extended or adjusted under 35 U.S.C. 154(b) by 289 days.

(21) Appl. No.: 11/960,624

(22) Filed: Dec. 19, 2007

(65) Prior Publication Data
US 2008/0141781 A1 Jun. 19, 2008

Related U.S. Application Data

(60) Provisional application No. 60/875,665, filed on Dec. 19, 2006.

(51) Int. Cl.
G01L 1/00 (2006.01)
G01N 3/00 (2006.01)
(52) U.S. Cl. .................. 73/786; 73/768; 73/803
(58) Field of Classification Search .......... 73/768, 73/786, 803
See application file for complete search history.

(56) References Cited

U.S. PATENT DOCUMENTS

| | | | |
|---|---|---|---|
| 3,960,008 A * | 6/1976 | Goble et al. ............... | 73/84 |
| 4,052,884 A * | 10/1977 | Milberger et al. .......... | 73/12.12 |
| 4,614,110 A | 9/1986 | Osterberg | |
| 5,099,696 A * | 3/1992 | Yabuuchi .................. | 73/784 |
| 5,172,587 A | 12/1992 | Long | |
| 5,402,667 A | 4/1995 | Atkinson et al. | |
| 5,576,494 A | 11/1996 | Osterberg | |
| 5,581,013 A * | 12/1996 | Frederick .................. | 73/11.03 |
| 5,608,169 A | 3/1997 | Fujioka et al. | |
| 6,371,698 B1 | 4/2002 | Beck, III et al. | |
| 6,869,255 B1 | 3/2005 | Beck, III et al. | |
| 6,942,429 B1 | 9/2005 | Beck, III et al. | |
| 7,353,714 B2 * | 4/2008 | England et al. ............ | 73/784 |
| 7,380,462 B2 * | 6/2008 | Choi et al. ................. | 73/786 |

FOREIGN PATENT DOCUMENTS

WO   WO 2006/015278   2/2006

OTHER PUBLICATIONS

"Development of Geotechnical Resistance Factors and Downdrag Load Factors for LRFD Foundation Strength Limit State Design." U.S. Department of Transportation Federal Highway Administration. Publication No. FHWA-NHI-05-052. Feb. 2005.*

* cited by examiner

Primary Examiner—Lisa M Caputo
Assistant Examiner—Punam Roy
(74) Attorney, Agent, or Firm—Saliwanchik, Lloyd & Saliwanchik

(57) ABSTRACT

An annular assembly, or ring cell, is provided for testing the load bearing capacity of piles. The ring cell walls of the annular assembly can be made of stamped material. The ring cell walls can be an outer ring wall and an inner ring wall. Alternately, the ring cell walls can have a "U"-type shape cross-section including an outer ring wall, an inner ring wall, and a top wall. Fluid can be provided to the annular assembly through fluid supply lines into an expansion zone. The expansion zone can be a space having a bladder for filling with fluid. In another embodiment, the expansion zone can be a space between a filler material capable of withstanding high pressure separated with a membrane. The pressure of the fluid in the expansion zone can be monitored during testing.

92 Claims, 11 Drawing Sheets

METHOD AND APPARATUS FOR TESTING LOAD-BEARING CAPACITY UTILIZING A RING CELL

CROSS-REFERENCE TO RELATED APPLICATION

The present application claims the benefit of U.S. Application Ser. No. 60/875,665, filed Dec. 19, 2006, which is hereby incorporated by reference herein in its entirety, including any figures, tables, or drawings.

FIELD OF THE INVENTION

Embodiments of the invention relate to a method and apparatus for testing the load-bearing capacity of concrete shafts utilizing a ring load cell.

BACKGROUND OF INVENTION

Drilled shafts or piers are often used in the deep foundation industry because they provide an economical alternative to other types of deep foundations. Drilled piers are typically formed by excavating a cylindrical borehole in the ground and then placing reinforcing steel and fluid concrete in the borehole. The excavation may be assisted by the use of drilling fluids, casements or the like. When the concrete hardens, a structural pier suitable for load bearing results. These piers may be several feet in diameter and 50 feet or more deep. They are typically designed to support axial and tensile compressive loads.

Piles, usually made out of concrete, are generally used to form the foundations of buildings or other large structures. A pile can be considered a rigid or a flexible pile. The purpose of a pile foundation is to transfer and distribute load. Piles can be inserted or constructed by a wide variety of methods, including, but not limited to, impact driving, jacking, or other pushing, pressure (as in augercast piles) or impact injection, and poured in place, with and without various types of reinforcement, and in any combination. A wide range of pile types can be used depending on the soil type and structural requirements of a building or other large structure. Examples of pile types include wood, steel pipe piles, precast concrete piles, and cast-in-place concrete piles, also known as bored piles, augercast piles, or drilled shafts. Augercast piles are a common form of bored piles in which a hollow auger is drilled into the ground and then retracted with the aid of pressure-injected cementations grout at the bottom end, so as to leave a roughly cylindrical column of grout in the ground, into which any required steel reinforcement is lowered. When the grout sets, the pile is complete. Piles may be parallel sided or tapered. Steel pipe piles can be driven into the ground. The steel pipe piles can then be filled with concrete or left unfilled. Precast concrete piles can be driven into the ground. Often, the precast concrete is prestressed to withstand driving and handling stresses. Cast-in-place concrete piles can be formed as shafts of concrete cast in thin shell pipes that have been driven into the ground. For the bored piles, a shaft can be bored into the ground and then filled with reinforcement and concrete. A casing can be inserted in the shaft before filling with concrete to form a cased pile. The bored piles, cased and uncased, and augercast, can be considered non-displacement piles.

A finished structural foundation element such as a pier or pile has an axial load bearing capacity that is conventionally characterized by components of end bearing ($q_b$) and side bearing, which is a function of skin friction ($f_s$). Loads applied at the top end of the element are transmitted to the sidewalls of the element and to the bottom of the element. The end bearing capacity is a measure of the maximum load that can be supported there, and it will depend on numerous factors including the diameter of the element and the composition of the geomaterial (soil, rock, etc.) at the bottom of the shaft. The side bearing capacity is a measure of the amount of load capable of being borne by the skin friction developed between the side of the pier/pile and the geomaterial. It depends on numerous factors, including the composition of the foundation element and the geomaterial forming the side of the element, which may vary with length (depth). The sum of the end bearing and side bearing capacities generally represents the total load that can be supported by the element without sinking or slippage, which could cause destructive movements for a finished building or bridge atop the foundation.

Although it is desirable to know the maximum end bearing and side bearing for a particular pier or driven pile, it is difficult to make such measurements with a high degree of confidence. Foundation engineering principles account for these difficulties by assigning end bearing and load bearing capacities to a foundation element based on its diameter and depth, the geomaterial at the end of the element and along its side, and other factors. A safety factor is then typically applied to the calculated end bearing and side bearing capacities. These safety factors are chosen to account for the large number of unknown factors that may adversely affect side bearing and end bearing, including geomaterial stress states and properties, borehole roughness generated by the drilling process, geomaterial degradation at the borehole-shaft interface during drilling, length of time the borehole remains open prior to the placement of concrete, residual effects of drilling fluids, borehole wall stresses produced by concrete placement, and other construction-related details. For example, it is common to apply a safety factor of 2 to the side bearing so as to reduce by half the amount calculated to be borne by skin friction. Likewise, a safety factor of 3 is often applied to the calculated end bearing capacity, reflecting the foregoing design uncertainties and others. Load Resistance Factor Design (LRFD) is an alternative analysis method used to design safe and efficient structural foundations by incorporating load and resistance factors based on the known variability of applied loads and material properties.

The use of safety factors, or LRFD factors, although judiciously accounting for many of the uncertainties in drilled shaft pier construction and driving piling, often results in such foundation elements being assigned safe load capacities that are too conservative. To compensate, builders construct larger, deeper, and/or more elements than are necessary to safely support a structural load, unnecessarily increasing the time, effort and expense of constructing a suitable foundation.

As a partial solution, it has been known to directly measure the end bearing capacity and skin friction of a drilled-shaft pier. This is typically accomplished at a production site by using one or more test piles.

Osterberg (U.S. Pat. Nos. 4,614,110 & 5,576,494) discloses a parallel-plate bellows placed in the bottom of the shaft before a concrete pier is poured. The bellows are pressured up with fluid communicated through a pipe coaxial with the pier. Skin friction is determined by measuring the vertical displacement of the pier (corresponding to the movement of the upper bellows plate) as a function of pressure in the bellows. Likewise, end bearing is determined by measuring pressure against the downward movement of the lower bellows plate, as indicated by a rod affixed thereto and extending above the surface through the fluid pipe. Upon completion of the load test, the bellows are depressurized. The bellows may then be abandoned or filled with cement grout, and in the latter case becomes in essence an extension of the lower end of the pier.

In that case, the non-functioning testing cell serves as the base of the pier and may thereby compromise the integrity of the shaft. In practice, a drilled shaft employing the "Osterberg cell" is often abandoned after testing in favor of nearby shafts that do not contain a non-functioning testing cell at their base. Because it is wasteful in terms of time, materials, effort and money to abandon a formed shaft merely because it was used for testing, there remains a need for a testing cell that causes less interference with use of the shaft after testing.

BRIEF SUMMARY

Embodiments of the present invention are directed to an apparatus and method for testing the load bearing capacity of one or more piles, or shafts, utilizing a ring, or annular, load cell. Embodiments of the invention can provide an apparatus and method for testing the load bearing capacity of one or more piles, or shafts, that reduce the interference with using the one or more piles, or shafts, after testing.

In a specific embodiment, an annular assembly can be used in production piles (e.g., piles used as a foundation of a structure). The annular assembly is capable of being used in production piles because it can be inexpensively manufactured and allows concrete and/or grout to pass through the assembly, while in place, during the casting of the pile.

In an embodiment, during construction, the subject ring cells can be placed in most, or all, production piles, if desired. In further embodiments, the subject ring cell can be placed in one or more piles and can remain in the one or more piles after testing. In one embodiment, at least 10% of the production piles can have ring cells. In other embodiments, at least 50%, at least 80%, at least 90%, or 100% of the production piles can have ring cells.

The piles having ring cells can be designed using a lower factor of safety, or an increased resistance factor (RF), because the piles being tested are the piles to be used. By testing such a large number of piles, and a large percentage of the piles to be used, when many of the piles incorporate embodiments of the subject ring cells, a greater confidence of the load bearing capacity of the group of piles as a whole can be achieved. In one embodiment the RF can be 0.6. In another embodiment the RF can be 0.9.

In an embodiment, a ring cell can be incorporated with a certain percentage of a plurality of piles that will be used to support a load. In a specific embodiment, at least 50%, at least 80%, at least 90%, and all of the piles incorporate ring cells. During testing, the ring cells provide a load that causes settling of the piles. In a specific embodiment, the load is equal to or greater than the load expected to occur during the intended use of the pile. In this way, a portion, if not all of the expected settling of the pile can be accomplished during testing.

In an embodiment, the ring cells can be inexpensively manufactured because the pieces can be made of stamped material or preformed or pre-cast material. Advantageously, in embodiments, the ring cell walls can be made by stamping material because of its curved shape. In particular, a curved shape ring cell can allow for stamping pieces out instead of welding and machining because the tolerances are not as tight.

Furthermore, the components of the ring cells can be selected for cost and simplicity. For example, a ring cell can incorporate stamped sheet metal, filler material that can withstand high pressures such as high strength grout, and/or rubber or fabric membranes or bladders.

It should be noted that embodiments of the subject invention can be used with one or more types and diameters of shafts and/or piles. In addition, one or more ring cells or annular assemblies in accordance with the invention can be used in a single pile shaft and can be located at various points along the shaft. The subject invention is intended to be placed at any level within the pile deemed to be suitable, which could be at or near the bottom of the drilled shaft or pile. Typically the predetermined elevation or depth would be selected so that the test does not reduce the competence of the shaft or pile. A specific embodiment of the invention incorporates an annular load testing assembly, including: a filler material capable of withstanding high pressure; an outer cylindrical wall having an inner surface that is lubricated for contacting the filler material; an inner cylindrical wall having an inner surface that is lubricated for contacting the filler material; and one or more fluid access lines for supplying a self-sealing fluid under pressure to a separation zone within the filler material, the separation zone provided by a membrane between the filler material. In a specific embodiment, a self-sealing high pressure fluid can be used, such that the fluid seals any leaks as the fluid is pushed into the leak. In another embodiment of the invention, there is provided an annular load testing assembly, including: an outer perimeter cylinder having an outer wall, an inner wall, and a top wall and an optional bottom wall; an inner perimeter cylinder fitting within the outer perimeter cylinder; a bladder positioned between a top surface of the inner perimeter cylinder and a bottom surface of the top wall of the outer perimeter cylinder; and one or more fluid access lines for supplying fluid to the bladder. In a specific embodiment, a self-sealing fluid can be used.

In yet another embodiment of the invention, there is provided an annular load testing assembly, including: a filler material capable of withstanding high pressure; an outer perimeter cylinder having an outer wall, an inner wall, a top wall, and an optional bottom wall, where an inner surface of the outer perimeter cylinder contacts the filler material; and one or more fluid access lines for supplying fluid to a separation zone between the filler material and the inner surface of the top wall portion of the outer perimeter cylinder, the separation zone including a membrane in contact with the filler material. In another embodiment of the invention there is provided a method of providing piles for a structure, the method including: inserting an annular assembly into one or more construction piles thus increasing the load-bearing capacity and/or stiffness of the load-bearing material below the pile; and followed by filling minor cracks and fissures formed during load testing with grout and/or concrete.

In yet another embodiment of the invention, there is provided an annular load testing assembly, including: a filler material capable of withstanding high pressure; an outer perimeter u-shaped cylinder having an outer wall, an inner wall, a top wall; an inner perimeter u-shaped cylinder having an outer wall, an inner wall and a bottom wall, where an inner surface of the outer wall of the outer perimeter cylinder contacts the outer surface of the outer wall of the inner perimeter cylinder and an inner surface of the inner wall of the outer perimeter u-shaped cylinder contacts the outer surface of the inner wall of the inner perimeter u-shaped cylinder; and one or more fluid access lines for supplying a self-sealing fluid to a separation zone between the filler material. The separation zone may include a membrane in contact with the filler material.

In another embodiment of the invention there is provided a method of providing piles for a structure, the method including: inserting an annular assembly into one or more construction piles thus increasing the load-bearing capacity and/or stiffness of the load-bearing material below the pile; and followed by filling minor cracks and fissures formed during load testing with grout and/or concrete.

It is to be understood that both the foregoing general description and the following detailed description of the present invention are exemplary and explanatory and are intended to provide further explanation of the invention as claimed.

BRIEF DESCRIPTION OF THE DRAWINGS

Reference will now be made in detail to the preferred embodiments of the present invention, examples of which are illustrated in the accompanying drawings. Wherever possible, the same reference numbers will be used throughout the drawings to refer to the same or like parts.

DETAILED DISCLOSURE OF THE INVENTION

Embodiments of the present invention are directed to an apparatus and method for testing the load bearing capacity of one or more piles, or shafts, utilizing a ring, or annular, load cell. Embodiments of the invention can provide an apparatus and method for testing the load bearing capacity of one or more piles, or shafts, and increases the desirability of using one or more of the tested piles as production piles. Embodiments of the invention can be used with a pile cast in place or drilled shaft pile.

In particular, the annular assembly can be used in production piles (e.g., piles used as a foundation of a structure). The annular assembly is capable of being used in production piles because it can be inexpensively manufactured and allows concrete and/or grout to pass through the assembly, while in place, during casting of the pile.

In an embodiment, during construction, the subject ring cells can be placed in most, or all, production piles, if desired. In further embodiments, the subject ring cell can be placed in one or more piles and can remain in the one or more piles after testing. In one embodiment, at least 10% of the production piles can have ring cells. In other embodiments, at least 50%, at least 80%, at least 90%, or 100% of the production piles can have ring cells.

The piles having ring cells can be designed using a lower factor of safety or an increased resistance factor (RF), because the piles being tested are the piles to be used. In one embodiment the RF can be 0.6. In another embodiment the RF can be 0.9. In an embodiment, the ring cells can be made cheaply because the pieces can be made of stamped material, or alternatively preformed or pre-cast materials. Advantageously, in embodiments, the ring cell walls can be made by stamping material because of its curved shape. In particular, a curved shape ring cell can allow for stamping pieces out instead of welding and machining because the tolerances are not as tight.

Furthermore, the components of the ring cells can be selected for cost and simplicity. For example, a ring cell can incorporate stamped sheet metal, filler material that can withstand high pressures such as high strength grout, and/or rubber or fabric membranes or bladders.

It should be noted that a self-sealing high pressure fluid may be used for embodiments not incorporating a bladder. This self-sealing fluid can be used as a hydraulic fluid substitute and is typically a chemical mix of friendly fibers, binders polymers and congealing agents that inter-twine and clot to form an impervious seal. A commercial compound with similar properties that can be used in an embodiment is Slime®.

It should be noted that embodiments of the subject invention can be used with one or more types of shafts and piles. In addition, one or more ring cells or annular assemblies in accordance with the invention can be used in a single pile shaft and can be located at various points along the shaft.

Figure 1A:
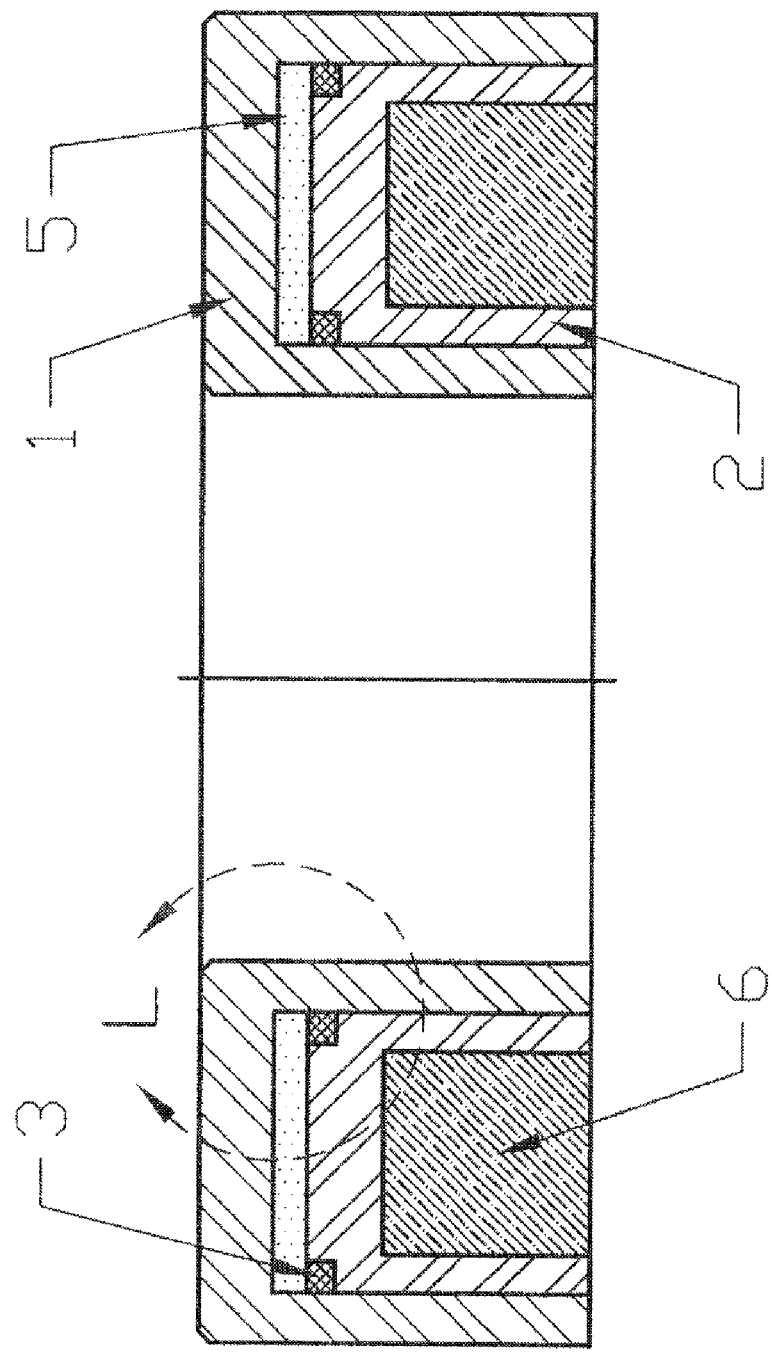
FIGS. 1A-1B show a sectional view and a fragmentary sectional view of a specific embodiment of the present invention.
Figure 1B:
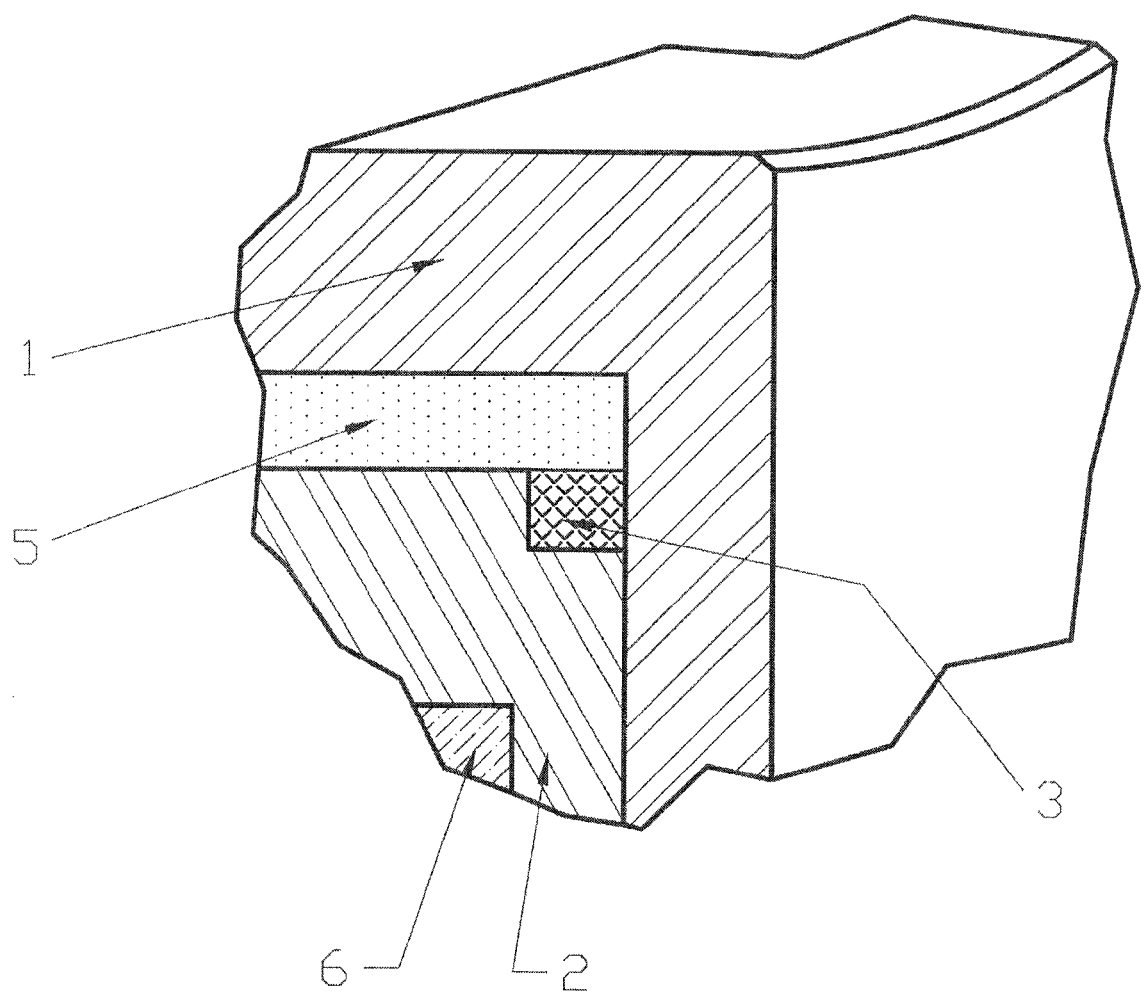

FIG. 1A shows a cross-section of an embodiment of the subject ring cell and FIG. 1B shows a magnified section L of FIG. 1A. The ring cell shown incorporates an annular-shaped outer ring 1 and an annular-shaped inner ring 2. The outer ring 1 and the inner ring 2 can have a "u" shaped cross-section including an outer ring wall, an inner ring wall, and a top wall. Outer ring 1 can be stamped out from a sheet of metal or formed via other manufacturing techniques, such as welding. Inner ring 2 can also be stamped out from a sheet of metal or formed via other manufacturing techniques, such as welding. In an embodiment, braided packing 3, 4 can be used to prevent fluid leakage from the ring cell. In further embodiments, a gasket or other impervious material 3, 4 can be used to prevent fluid leakage from the ring cell. Bladder 5 can be filled with hydraulic fluid. As fluid fills the bladder, the bladder expands. The amount of fluid supplied to the bladder and the resulting pressure can be monitored during load testing. In one embodiment, a hydraulic pump can be used to inflate the bladder.

Figure 2A:
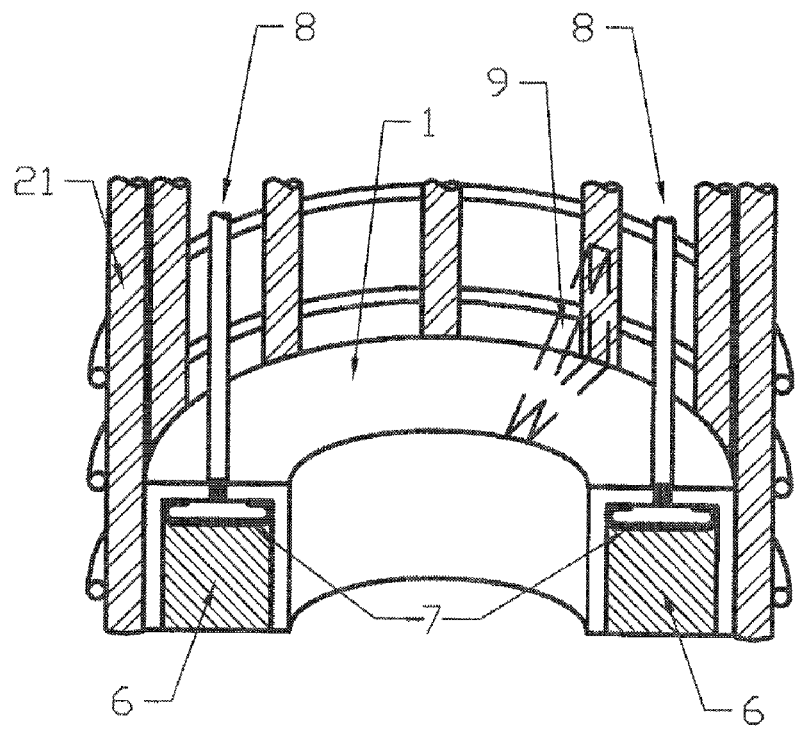
FIGS. 2A-2C show a sectional view of a specific embodiment of the present invention.
Figure 2B:
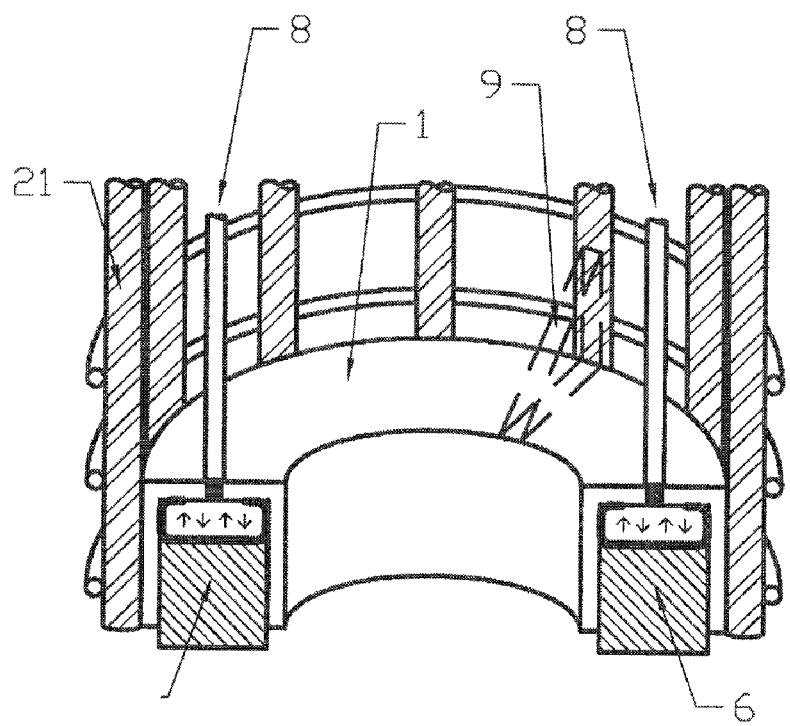

In an alternate embodiment as shown in FIG. 2A, the ring cell can incorporate an outer ring 1 and filler material 6 instead of the inner ring. In a specific embodiment, the filler material can be a high strength grout (HSG) or elastomeric epoxy material. A rubber or fabric membrane 7 can be positioned between a top plate of the outer ring 1 and the filler material to provide a separation zone. Alternatively, a bladder 5 can be used in place of the membrane 7. One or more hydraulic fluid access lines 8 can provide fluid to the separation zone through the top plate of the outer ring. As pressure builds, the membrane pushes against the filler material as shown in FIG. 2B.

Figure 3A:
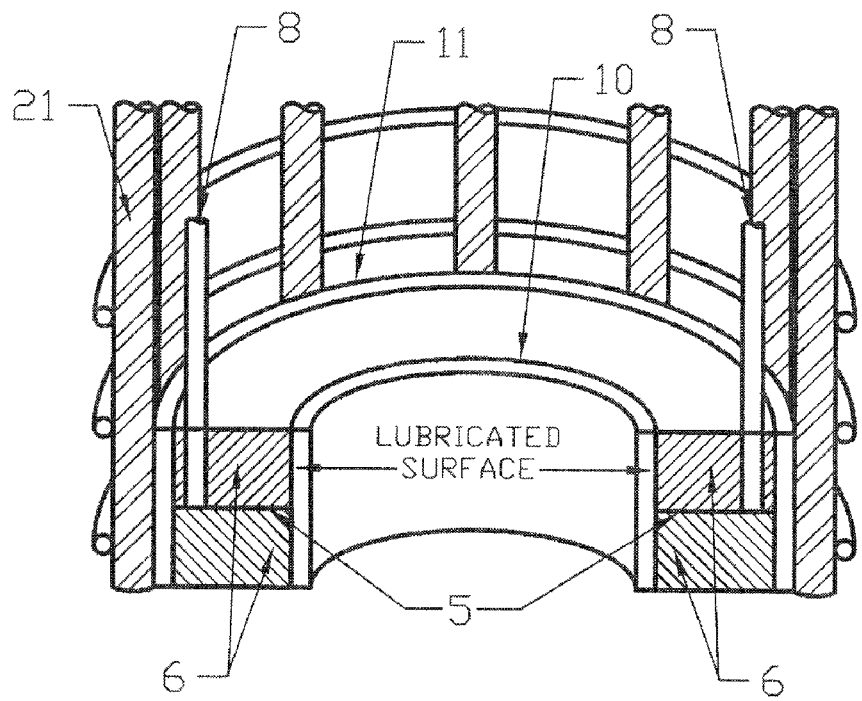
FIGS. 3A-3C show a sectional view of a specific embodiment of the present invention.
Figure 3B:
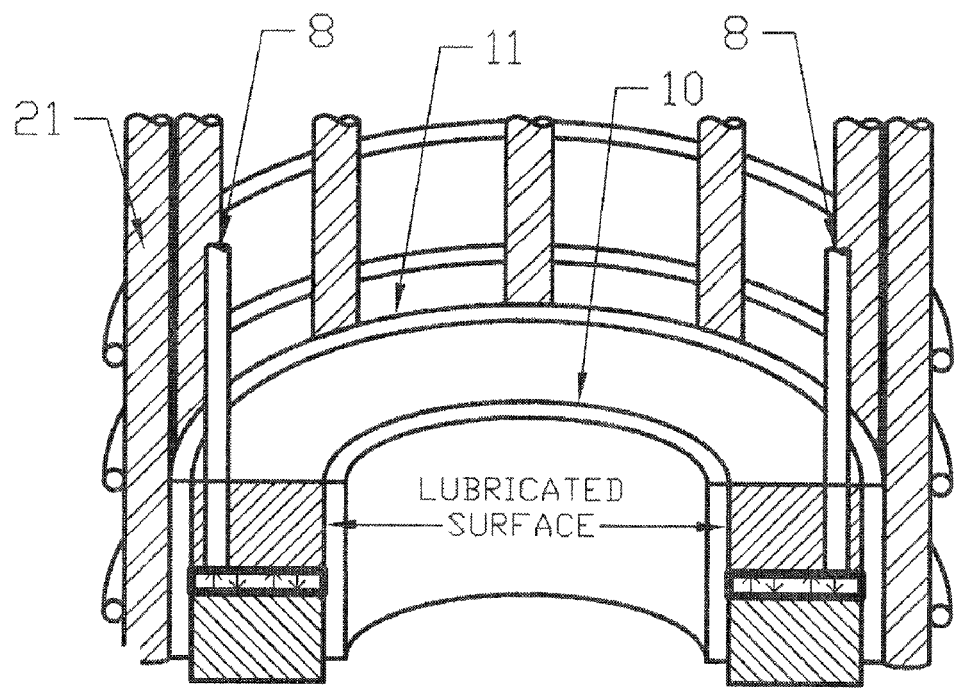
Figure 3C:
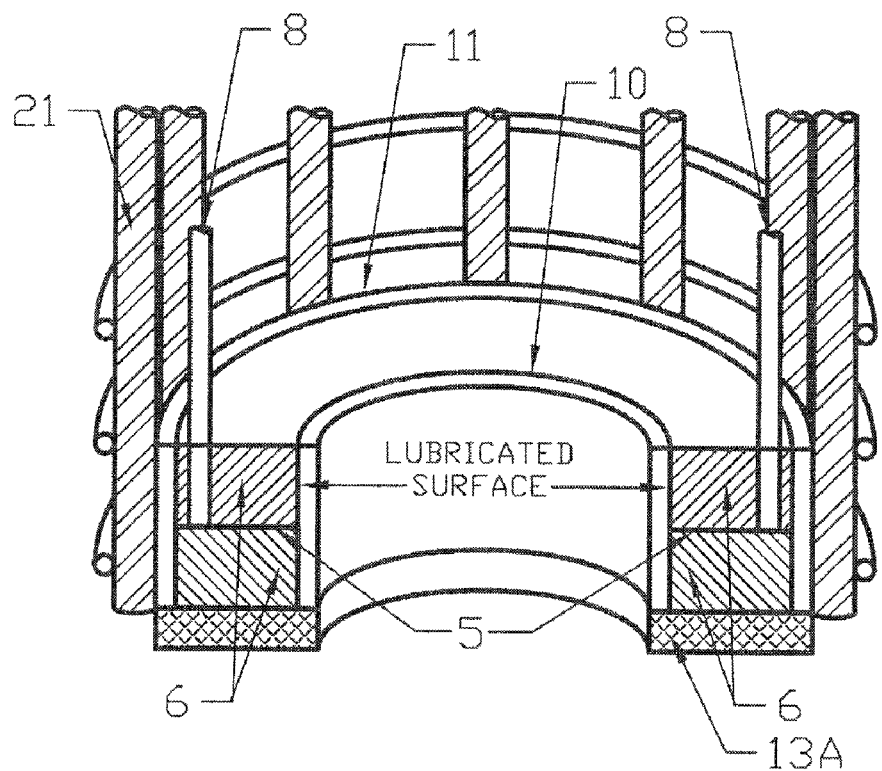

In another embodiment as shown in FIG. 3A, the ring cell can incorporate an inner cylinder wall 10 and an outer cylinder wall 11. Inner cylinder wall 10 and outer cylinder wall 11 can be made of steel, high strength polymer/plastic, or other appropriate materials known in the art that are able to withstand the high pressures. Inner cylinder wall 10 and outer cylinder wall 11 can be substantially parallel. A filler material 6 such as HSG can be positioned between the parallel side walls 10, 11. The inner surface of the parallel side walls can be lubricated such that the filler material 6 can slide with reduced friction from the side walls as fluid fills a bladder 5 or the space between a rubber or fabric membrane 7. The top and bottom portions of the ring cell can be situated within a pile such that a top surface of the filler material 6 contacts the pile material above the ring cell and the bottom surface of the filler material 6 contacts the pile material below the ring cell. One or more hydraulic fluid access lines 8 can provide fluid to the separation zone through the top of the filler material 6. As pressure builds, the membrane pushes against the filler material as shown in FIG. 3B. Concrete, or other materials to form the pile, can be poured through the opening in the center of the ring cell for ease of positioning of the ring cell.

Figure 4A:
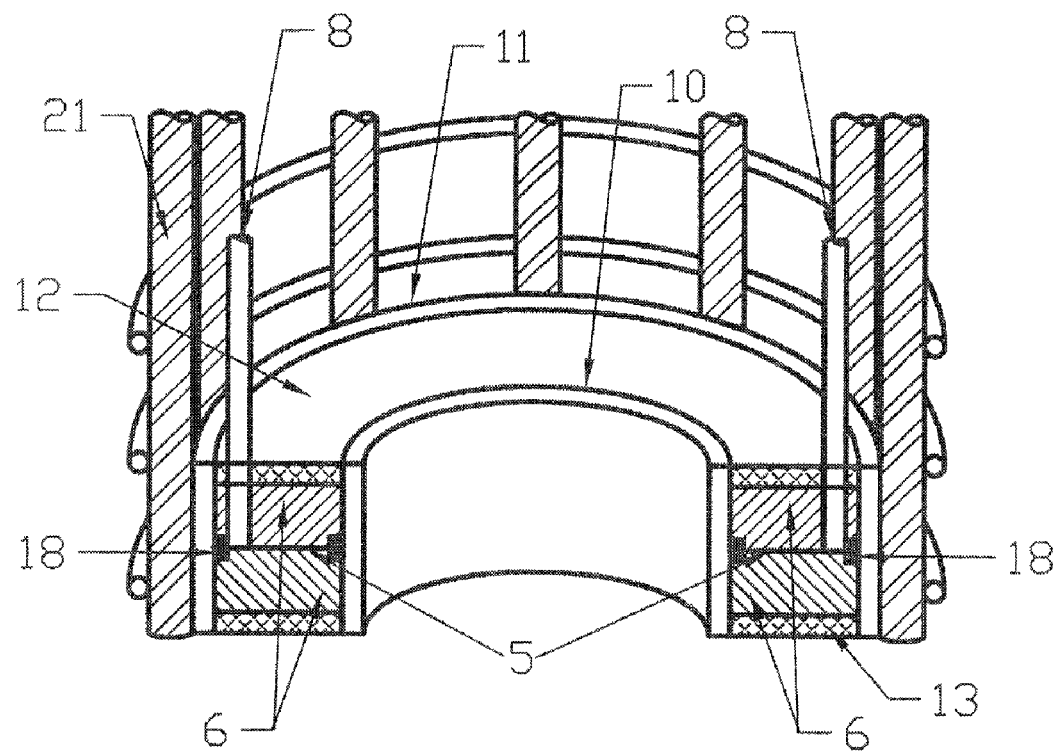
FIGS. 4A-4C show a sectional view of a specific embodiment of the present invention.
Figure 4B:
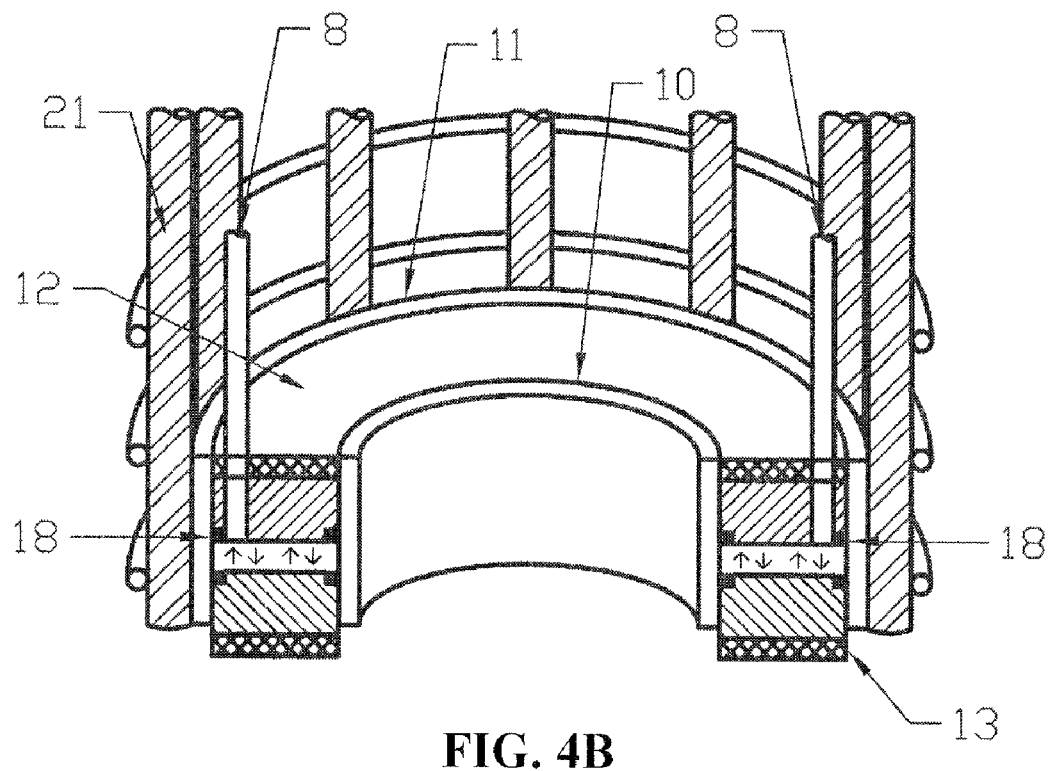
Figure 4C:
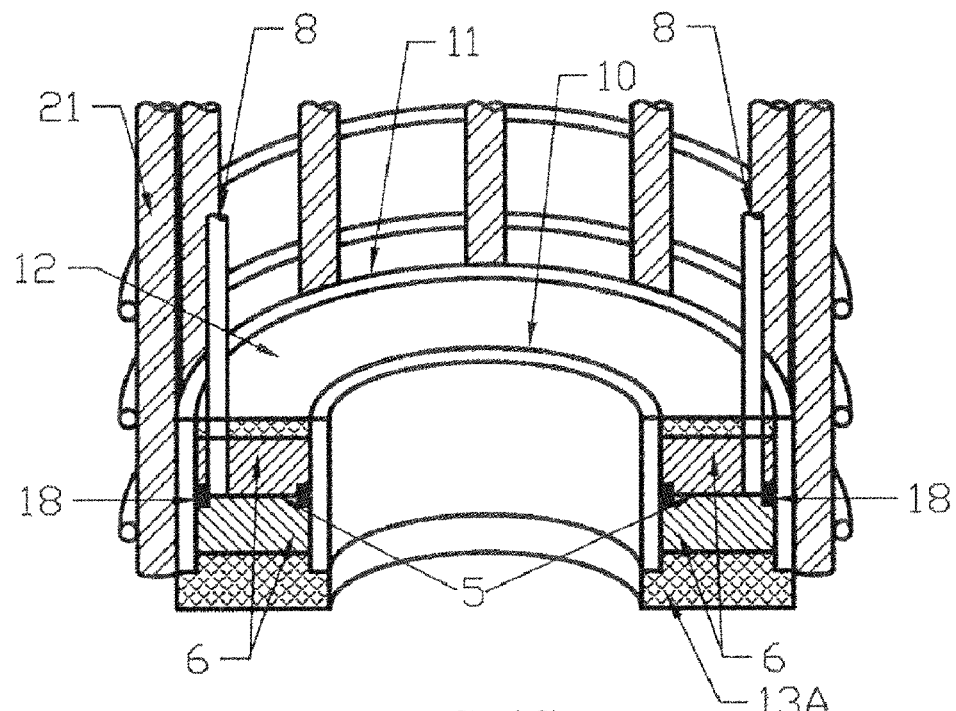

In a further embodiment as shown in FIG. 4A, the ring cell can incorporate a top plate 12 and a bottom plate 13 or 13a where the inner and outer cylinder walls 10, 11 and top and bottom plates 12, 13 or 13a enclose a filler material 6, such as high strength grout (HSG) or elastomeric epoxy material separated into a top portion and a bottom portion by a rubber or fabric membrane. A fluid access line enters the ring cell through the top plate and upper portion of filler material and into the rubber or fabric membrane separator. O-rings or other seals 18 can also be used if needed. One or more hydraulic fluid access lines 8 can provide fluid to the separation zone through the top plate 12 of the outer ring and upper filler material 6. As pressure builds, the membrane pushes against the filler material as shown in FIG. 4B.

Figure 5A:
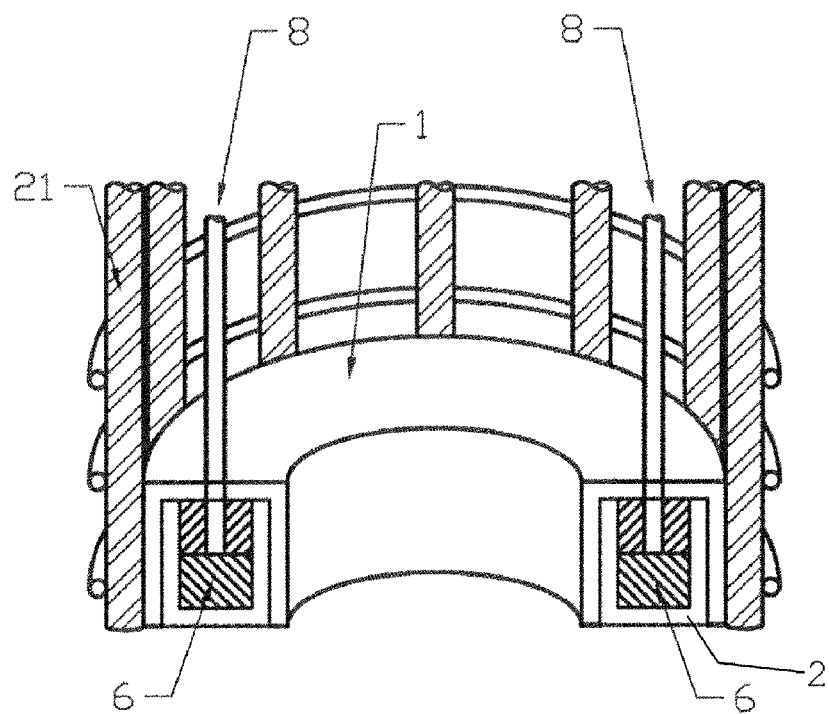
FIGS. 5A-5C show an embodiment of the subject invention with respect to a bore hole.
Figure 5B:
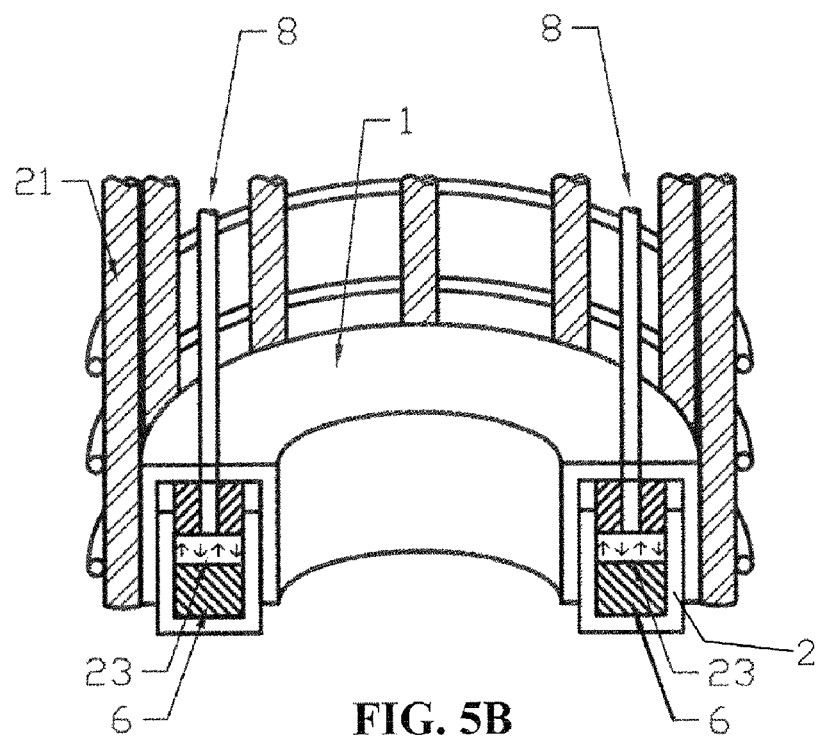
Figure 5C:
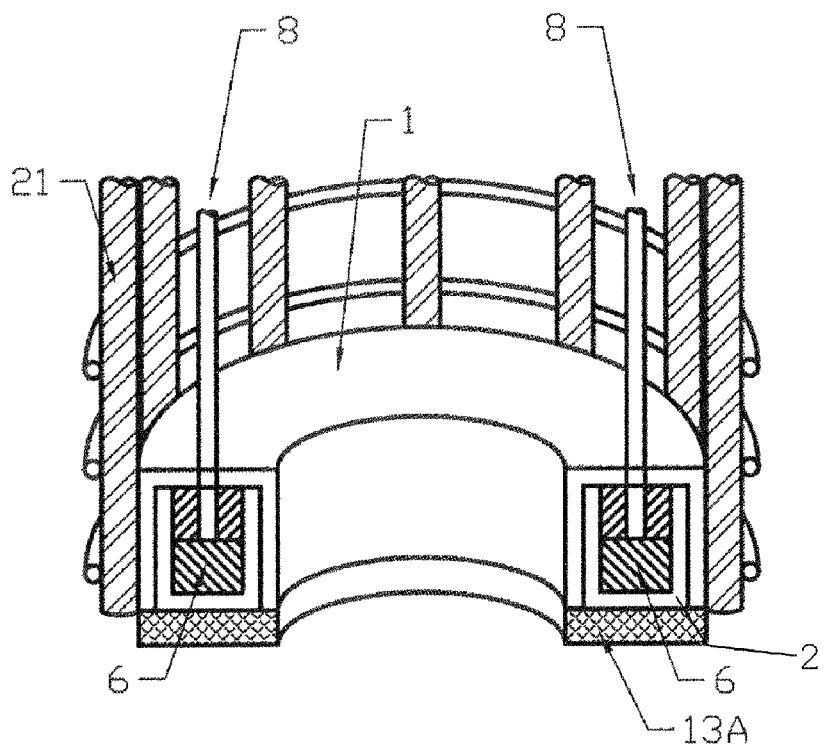

In a further embodiment as shown in FIG. 5A, the ring cell can incorporate an outer perimeter u-shaped cylinder 1 having an outer wall, an inner wall, a top wall; an inner perimeter u-shaped cylinder 2 having an outer wall, an inner wall and a bottom wall, where the outer perimeter cylinder 1 and the inner perimeter cylinder 2 enclose a filler material 6, such as high strength grout (HSG) or elastomeric epoxy material separated into a top portion and a bottom portion not necessarily by a rubber or fabric membrane. A fluid access line 8 or lines enters the ring cell through the top perimeter u-shaped cylinder and the upper filler material into the separation area. If a self-sealing fluid 23 is used, a rubber or fabric membrane 7 or bladder 5 would not be necessary. Once the fluid begins to enter the separation area at pressure the inner u-shaped cylinder will be forced toward the outer u-shaped cylinder, tending to seal the inner u-shaped cylinder walls to the outer u-shaped cylinder walls to inhibit the self-sealing fluid from escaping.

Figure 6A:
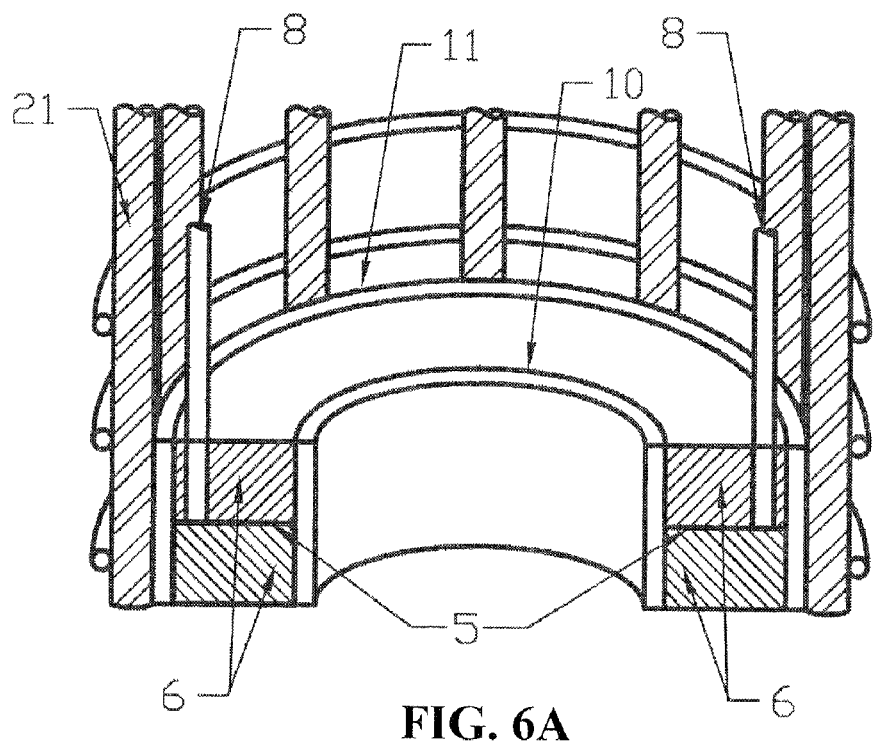
FIGS. 6A-6C show embodiments of varying cross-sectional area.
Figure 6B:
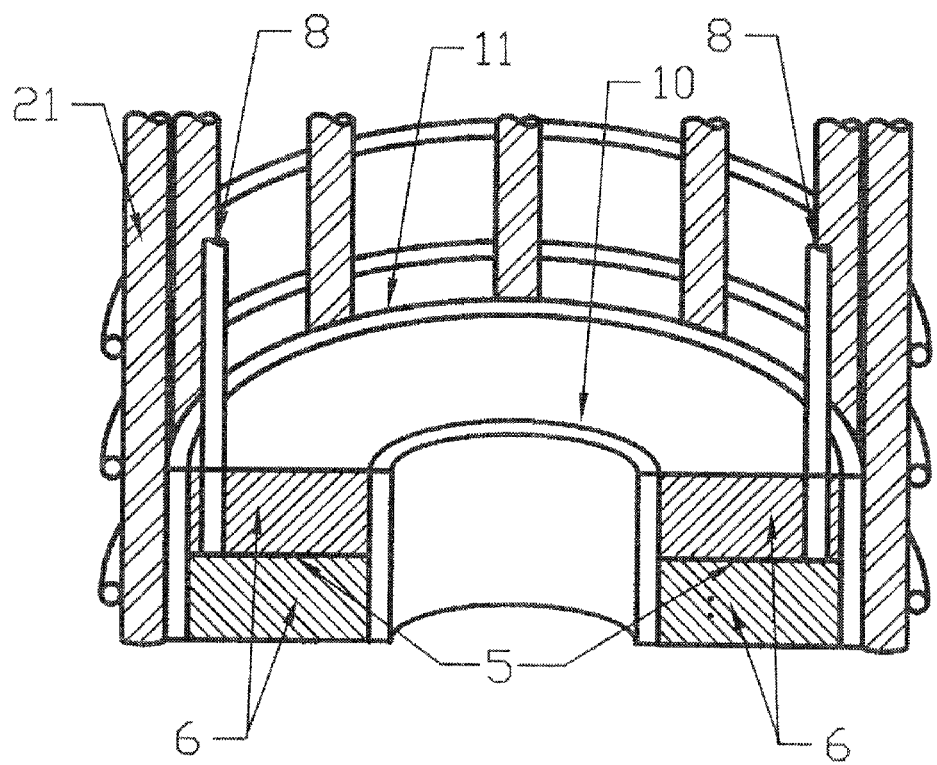
Figure 6C:
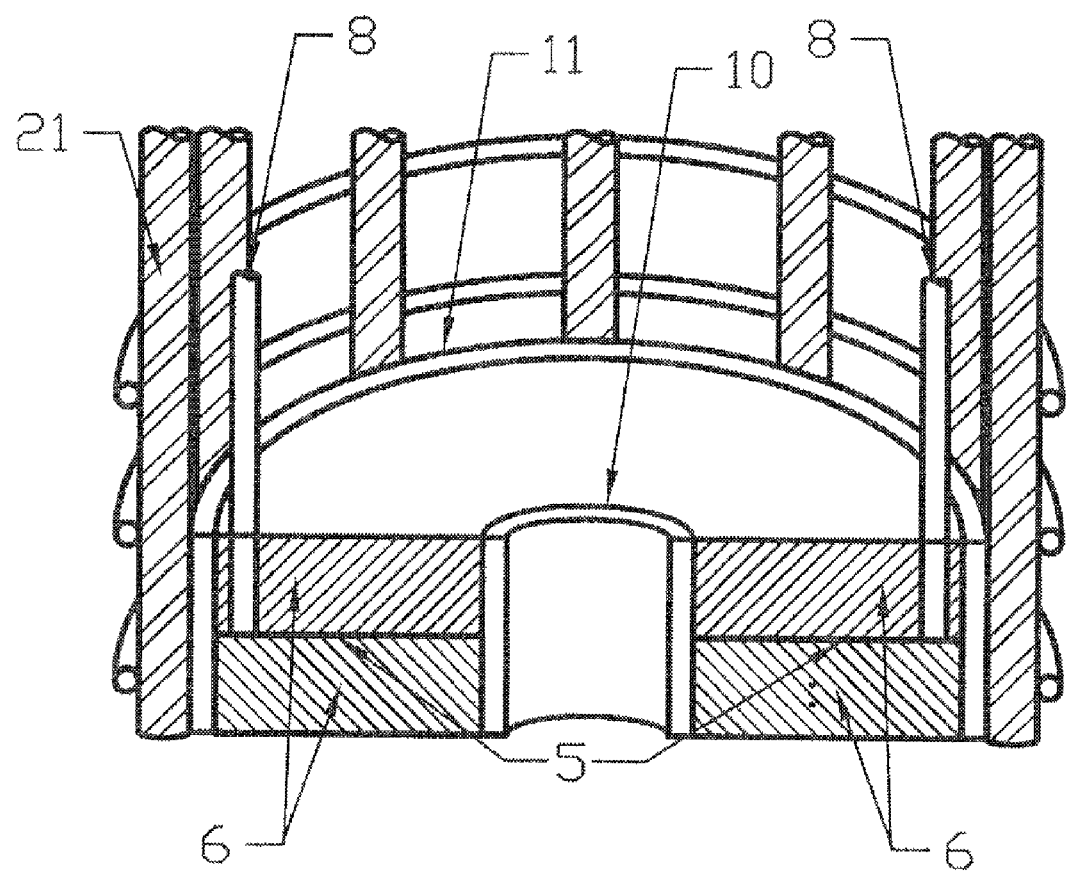

The size of the annular assembly can depend on the size of the shaft or bore hole. The outer wall of the ring cell can have a radius of a size to allow proximate location to a rebar cage while the ring cell is in a shaft. The size of the walls can be determined by the surface required to apply proper force. Embodiments with top plates and/or bottom plates can have the plates attached to the section of pile above the load cell and/or the section of the pile below the load cell. The top portion of the load cell and the bottom portion of the load cell are positioned so that when they separate their relative lateral position remains the same. In this way the section of pile above, the top portion of the cell, the bottom portion of the cell, and an optional section of the pile below the cell act as a single pile, rather than two floating pile sections. If the cell is located at the bottom of a shaft, the cell can lie on ground or, for example, on a piece of concrete, which can be six inches to one foot thick or other appropriate thickness. The open center of the ring cell allows ease of access to inject concrete, or other pile material, past the ring cell to form the portion of the pile below the ring cell. In various specific embodiments, the opening in the center of the ring cell can be at least 25%, at least 50%, and at least 75% of the cross-sectional area of the ring cell. In a specific embodiment as shown in FIG. 6C, the opening in the center of the ring cell can be at least 20% of the cross-sectional area of the ring cell to facilitate the passage of concrete through the opening. In another embodiment as shown in FIG. 6B, the opening is at least 40% of the cross-sectional area of the ring cell, and in a further specific embodiment as shown in FIG. 6A, the opening is at least 60% of the cross-sectional area of the ring cell.

In embodiments, fluid for pressurizing can provide self sealing properties via the fluid lines 8 that can obviate the need for seals to contain the high pressure. In specific embodiments, a self-sealing fluid can be used that can seal any leaks in the assembly. Such sealing fluids can be, for example, fibrous. The use of a self-sealing fluid can reduce the need for tighter tolerances and/or other sealing mechanisms, such as o-rings. The use of self sealing fluid can reduce costs of manufacture and/or operation of embodiments of the ring cell. In other embodiments, seals 18 such as o-rings can be used where sealing is desired or necessary. Such an example is shown in FIG. 4A. Embodiments incorporating a bladder can use a variety of fluids such as water.

Figure 2C:
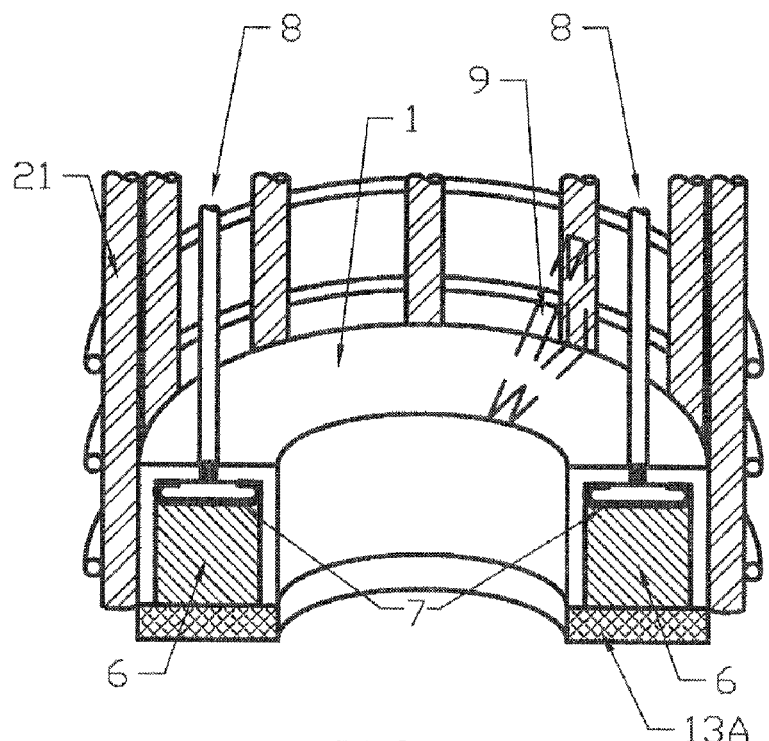

A concrete pile can completely surround the annular assembly. Concrete can be poured through the hole of the ring cell and fill the volume around the entire annular assembly. The outer wall of the ring cell can have a mechanism to be attached to a rebar cage 21, shown in FIG. 2. The mechanism can be one or more brackets 9.

Figure 7:
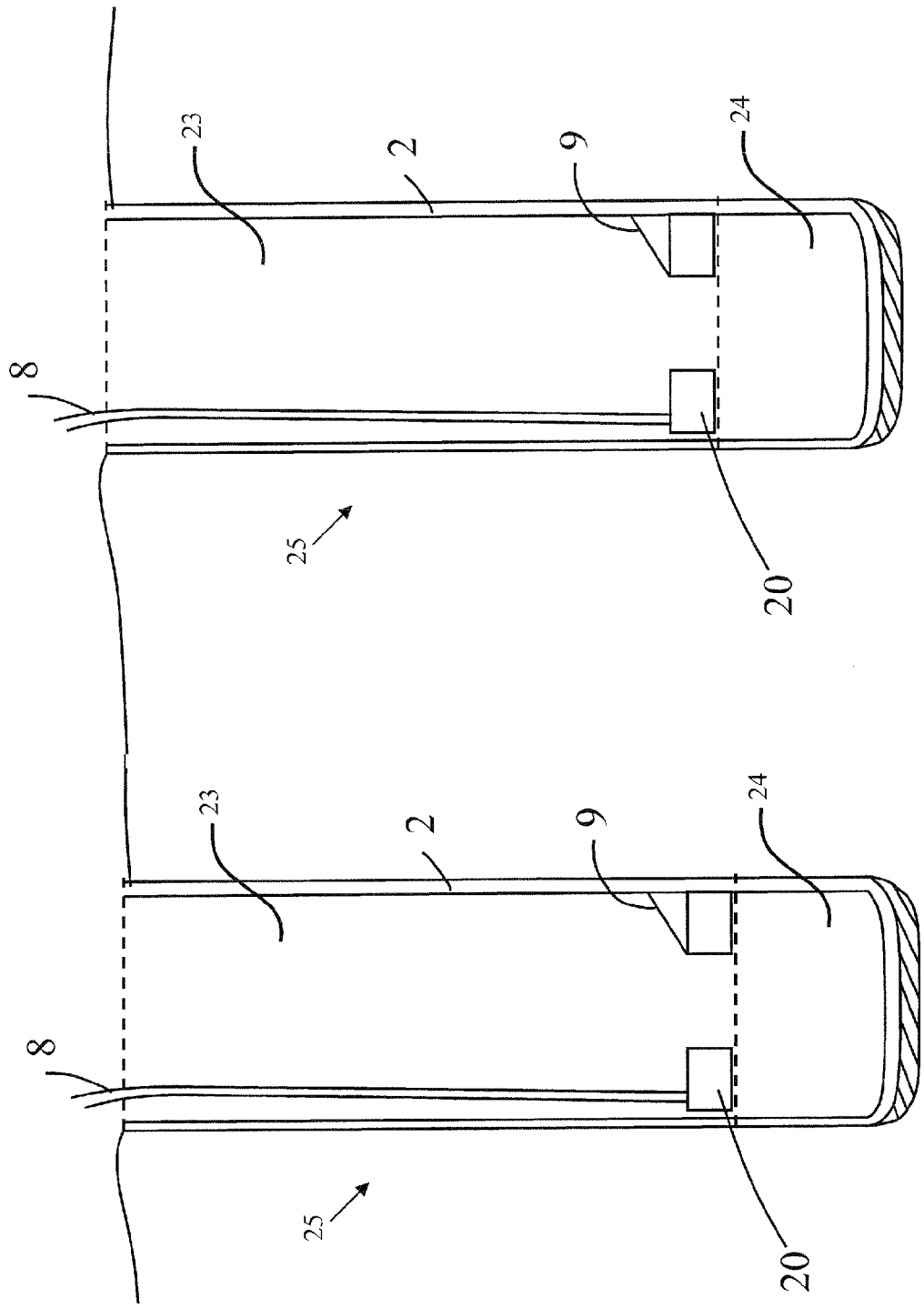
FIG. 7 shows an embodiment incorporating a ring cell within a pile.

During testing of a pile, the concrete of the pile can be cracked by the expansion of the ring cell. Accordingly, minor cracks or fissures can appear in the pile. These fissures can be filled with concrete and/or grout. These cracks can be filled by techniques known in the art, such as via supply or vent lines. In embodiments of the annular assembly where a bladder is used, the bladder can be filled with grout that hardens or sets up after the testing is complete. In specific embodiments, the ring cell can be positioned at, or near, the bottom of a drilled shaft. In other embodiments, the ring cell can be positioned in other portions of the pile, or in multiple locations in the pile. Referring to FIG. 7, an embodiment is shown where a ring cell 20 can be located within a pile. The ring cell 20 can be attached to a rebar cage 21 by, for example, a bracket 9. In one embodiment, the fluid supply lines 8 can supply grout to the bladder or expansion zone instead of pressurized water or hydraulic fluid. In another embodiment where pressurized water is used for testing, the water can be removed through an output line (not shown) as grout is supplied into the ring cell. In a further embodiment, the void created between a section of the pile above the ring cell and a section of the pile below the ring cell can be filled in with, for example, grout, as well as filling the expansion zone. Preferably, the ring cell is designed such that when expanded, the portion of the ring cell that tends to move up upon expansion of the ring cell (top) is sufficiently attached to the portion of the pile above the ring cell, the portion of the ring cell that tends to move down upon expansion of the ring cell (bottom) is sufficiently attached to the portion of the pile below the ring cell, and the top portion and bottom portion remain sufficiently interconnected to prevent relative lateral motion of the portion of the pile connected to the top portion and the portion of the pile connected to the bottom portion. In this way, once the expansion zone of the ring cell is filled with a material that prevents the top portion and bottom portion from coming back toward each other after expansion, the ring cell is coupled to the portion of the pile above the ring cell and the portion of the pile below the ring cell such as to retain the integrity of the pile as a single pile, rather than two pile sections floating with respect to each other either vertically or laterally.

One monitored measurement can be the volume of fluid used through the fluid lines into a separation/expansion zone. The volume measurement can provide a means to monitor the opening of the annular assembly. According to embodiments of the present invention, many techniques to measure movement can be used. In one embodiment, the movement of a flexible piece can be measured as known in the art. In a second embodiment, a sonar system can monitor movement. In a third embodiment, a light based system (laser or photoelectric, for example) can be used to monitor distance. In a fourth embodiment, the amount of fluid supplied to the bladder and the pressure of the fluid can be monitored. The measurements may need to be calibrated due to a variety of factors such as hose expansion.

It should be understood that the examples and embodiments described herein are for illustrative purposes only and that various modifications or changes in light thereof will be suggested to a person skilled in the art and are to be included within the spirit and purview of this application.

What is claimed is:

1. A method of applying a load to a pile, comprising:
   locating a top portion below a first section of a pile, wherein the top portion is attached to the first section of the pile;
   locating a bottom portion proximate the top portion, wherein a separation zone is created such that injection of a pressurized fluid into the separation zone causes a force tending to push the top portion and the bottom portion apart and causes the top portion to push up on the first section of the pile, wherein at least a portion of the cross-section of the top portion and at least a portion of the cross-section of the bottom portion is open so as to allow the passage of materials from above the top portion to below the bottom portion, wherein if separation of the top portion and the bottom portion occurs, the top portion and bottom portion maintain relative lateral position during separation; and
   injecting fluid into the separation zone in order to apply a load to the pile, wherein the top portion and bottom portion are located before casting of the pile, wherein materials for casting the pile pass through the open portion of the top portion cross-section and the open portion of the bottom portion cross-section.

2. The method according to claim 1, wherein the bottom portion is located above a second section of the pile, wherein the bottom portion is attached to the second section of the pile.

3. The method according to claim 2, wherein the first section of the pile, the top portion, the bottom portion, and the second section of the pile act as a single pile.

4. The method according to claim 2, wherein the bottom portion comprises a bottom plate, wherein the bottom plate is attached to the second section of the pile.

5. The method according to claim 2, further comprising:
   determining a load applied to the first section of the pile and the second section of the pile.

6. The method according to claim 1, wherein at least 20% of the cross-sectional area of the top portion and at least 20% of the cross-sectional area of the bottom portion are open.

7. The method according to claim 1, wherein at least 40% of the cross-sectional area of the top portion and at least 40% of the cross-sectional area of the bottom portion are open.

8. The method according to claim 1, wherein at least 60% of the cross-sectional area of the top portion and at least 60% of the cross-sectional area of the bottom portion are open.

9. The method according to claim 1, wherein the fluid is self-sealing.

10. The method according to claim 1, wherein the pressurized fluid is injected into a bladder in the expansion zone.

11. The method according to claim 1, wherein the top portion is annular-shaped with a u-shaped cross-section, wherein the bottom portion is annular-shaped with a cross-section shaped complementary to the u-shaped cross-section of the top portion.

12. The method according to claim 1, further comprising:
    determining a load applied to the pile.

13. The method according to claim 1, further comprising:
    after injecting fluid into the separation zone, filling the separation zone with a material capable of hardening so as to maintain the separation of the top portion and the bottom portion, wherein the top section of the pile, the top portion, and the bottom portion act as a single pile.

14. The method according to claim 1, wherein the pressurized fluid is injected into the separation zone after casting the pile.

15. The method according to claim 1, wherein the open portion of the cross-section of the top portion is located at a center of the cross-section of the top portion, wherein the open portion of the cross-section of the bottom portion is located at a center of the cross-section of the bottom portion.

16. A method of applying a load to a pile, comprising:
    locating a top portion below a first section of a pile, wherein the top portion is attached to the first section of the pile;
    locating a bottom portion proximate the top portion, wherein a separation zone is created such that injection of a pressurized fluid into the separation zone causes a force tending to push the top portion and the bottom portion apart and causes the top portion to push up on the first section of the pile, wherein at least a portion of the cross-section of the top portion and at least a portion of the cross-section of the bottom portion is open so as to allow the passage of materials from above the top portion to below the bottom portion, wherein if separation of the top portion and the bottom portion occurs, the top portion and bottom portion maintain relative lateral position during separation; and
    injecting fluid into the separation zone in order to apply a load to the pile, wherein the top portion is annular-shaped with a u-shaped cross-section, wherein the bottom portion is annular-shaped with a cross-section shape complementary to the u-shaped cross-section of the top portion, wherein the top portion comprises an inner wall and an outer wall that form sides of the u-shape and a first filler material capable of withstanding high pressure that forms a first boundary of the separation zone, wherein the bottom portion comprises a second filler material capable of withstanding high pressure that forms a section boundary of the separation zone, wherein as the top portion and bottom portion separate, the inner wall and the outer wall of the top portion become additional boundaries of the separation zone.

17. The method according to claim 16, wherein the bottom portion is located above a second section, of the pile, wherein the bottom portion is attached to the second section of the pile.

18. The method according to claim 17, wherein the first section of the pile, the top portion, the bottom portion, and the second section of the pile act as a single pile.

19. The method according to claim 17, wherein the bottom portion comprises a bottom plate, wherein the bottom plate is attached to the second section of the pile.

20. The method according to claim 17, further comprising:
    determining a load applied to the first section of the pile and the second section of the pile.

21. The method according to claim 16, wherein at least 20% of the cross-sectional area of the top portion and at least 20% of the cross-sectional area of the bottom portion are open.

22. The method according to claim 16, wherein at least 40% of the cross-sectional area of the top portion and at least 40% of the cross-sectional area of the bottom portion are open.

23. The method according to claim 16, wherein at least 60% of the cross-sectional area of the top portion and at least 60% of the cross-sectional area of the bottom portion are open.

24. The method according to claim 16, wherein the top portion and bottom portion are located before casting of the pile, wherein materials for casting the pile pass through the open portion of the top portion cross-section and the open portion of the bottom portion cross-section.

25. The method according to claim 24, wherein the pressurized fluid is injected into the separation zone after casting the pile.

26. The method according to claim 16, wherein the fluid is self-sealing.

27. The method according to claim 16, wherein the pressurized fluid is injected into a bladder in the expansion zone.

28. The method according to claim 16, further comprising: determining a load applied to the pile.

29. The method according to claim 16, further comprising: after injecting fluid into the separation zone, filling the separation zone with a material capable of hardening so as to maintain the separation of the top portion and the bottom portion, wherein the top section of the pile, the top portion, and the bottom portion act as a single pile.

30. The method according to claim 16, wherein the open portion of the cross-section of the top portion is located at a center of the cross-section of the top portion, wherein the open portion of the cross-section of the bottom portion is located at a center of the cross-section of the bottom portion.

31. A method of applying a load to a pile, comprising:
locating a top portion below a first section of a pile, wherein the top portion is attached to the first section of the pile;
locating a bottom portion proximate the top portion, wherein a separation zone is created such that injection of a pressurized fluid into the separation zone causes a force tending to push the top portion and the bottom portion apart and causes the top portion to push up on the first section of the pile, wherein at least a portion of the cross-section of the top portion and at least a portion of the cross-section of the bottom portion is open so as to allow the passage of materials from above the top portion to below the bottom portion, wherein if separation of the top portion and the bottom portion occurs, the top portion and bottom portion maintain relative lateral position during separation; and
injecting fluid into the separation zone in order to apply a load to the pile, wherein the top portion is annular-shaped with a u-shaped cross-section, wherein the bottom portion is annular-shaped with a u-shaped cross-section shape having an open end, wherein the open end of the bottom portion is positioned in the u-shaped top portion, wherein as pressurized fluid is injected into the separation zone an outer wall of the bottom portion is pushed into an outer wall of the top portion to create a seal and an inner wall of the bottom portion is pushed into an inner wall of the top portion to create a seal.

32. The method according to claim 31, wherein the bottom portion is located above a second section of the pile, wherein the bottom portion is attached to the second section of the pile.

33. The method according to claim 32, wherein the bottom portion comprises a bottom plate, wherein the bottom plate is attached to the second section of the pile.

34. The method according to claim 32, further comprising: determining a load applied to the first section of the pile and the second section of the pile.

35. The method according to claim 32, wherein the first section of the pile, the top portion, the bottom portion, and the second section of the pile act as a single pile.

36. The method according to claim 31, wherein at least 20% of the cross-sectional area of the top portion and at least 20% of the cross-sectional area of the bottom portion are open.

37. The method according to claim 31, wherein at least 40% of the cross-sectional area of the top portion and at least 40% of the cross-sectional area of the bottom portion are open.

38. The method according to claim 31, wherein at least 60% of the cross-sectional area of the top portion and at least 60% of the cross-sectional area of the bottom portion are open.

39. The method according to claim 31, wherein the top portion and bottom portion are located before casting of the pile, wherein materials for casting the pile pass through the open portion of the top portion cross-section and the open portion of the bottom portion cross-section.

40. The method according to claim 39, wherein the pressurized fluid is injected into the separation zone after casting the pile.

41. The method according to claim 31, wherein the fluid is self-sealing.

42. The method according to claim 31, wherein the pressurized fluid is injected into a bladder in the expansion zone.

43. The method according to claim 31, further comprising: determining a load applied to the pile.

44. The method according to claim 31, further comprising: after injecting fluid into the separation zone, filling the separation zone with a material capable of hardening so as to maintain the separation of the top portion and the bottom portion, wherein the top section of the pile, the top portion, and the bottom portion act as a single pile.

45. The method according to claim 31, wherein the open portion of the cross-section of the top portion is located at a center of the cross-section of the top portion, wherein the open portion of the cross-section of the bottom portion is located at a center of the cross-section of the bottom portion.

46. A method of applying a load to a pile, comprising:
locating a top portion below a first section of a pile, wherein the top portion is attached to the first section of the pile;
locating a bottom portion proximate the top portion, wherein a separation zone is created such that injection of a pressurized fluid into the separation zone causes a force tending to push the top portion and the bottom portion apart and causes the top portion to push up on the first section of the pile, wherein at least a portion of the cross-section of the top portion and at least a portion of the cross-section of the bottom portion is open so as to allow the passage of materials from above the top portion to below the bottom portion, wherein if separation of the top portion and the bottom portion occurs, the top portion and bottom portion maintain relative lateral position during separation; and
injecting fluid into the separation zone in order to apply a load to the pile, wherein the bottom portion is located above a second section of the pile, wherein the bottom portion is attached to the second section of the pile, further comprising:
determining a load applied to the first section of the pile and the second section of the pile, wherein the first section of the pile and the second section of the pile are contiguous through the open portion of the cross-section of the top portion and the open portion of the cross-section of the bottom portion, wherein after injecting fluid into the separation zone, further comprising filling cracks between the first section of the pile and the second section of the pile in the portion of the pile contiguous through the open portion of the cross-section of the top portion and the open portion of the cross-section of the bottom portion.

47. A method of applying a load to a pile, comprising:
locating a top portion below a first section of a pile, wherein the top portion is attached to the first section of the pile;
locating a bottom portion proximate the top portion, wherein a separation zone is created such that injection of a pressurized fluid into the separation zone causes a force tending to push the top portion and the bottom portion apart and causes the top portion to push up on the first section of the pile, wherein at least a portion of the cross-section of the top portion and at least a portion of the cross-section of the bottom portion is open so as to allow the passage of materials from above the top portion to below the bottom portion, wherein if separation of the top portion and the bottom portion occurs, the top portion and bottom portion maintain relative lateral position during separation; and
injecting fluid into the separation zone in order to apply a load to the pile, wherein the bottom portion is located above a second section of the pile, wherein the bottom portion is attached to the second section of the pile, further comprising:
determining a load applied to the first section of the pile and the second section of the pile, wherein the bottom portion is located above a second section of the pile, wherein the first section of the pile and the second section of the pile are contiguous around an outer perimeter of the cross-section of the top portion and an outer perimeter of the cross-section of the bottom portion, wherein after injecting fluid into the separation zone, further comprising filling cracks between the first section of the pile and the second section of the pile in the portion of the pile contiguous around the outer perimeter of the cross-section of the top portion and an outer perimeter of the cross-section of the bottom portion.

48. A method of providing a plurality of piles for bearing a working load, comprising:
locating a plurality of piles in position in a strata for bearing a working load, wherein at least two of the piles incorporate a load cell, wherein each load cell comprises:
a top portion located below a first section of a pile; and
a bottom portion located proximate the top portion, wherein a separation zone is created such that injection of a pressurized fluid into the separation zone causes a force tending to push the top portion and the bottom portion apart, and causes the top portion to push up on the first section of the pile, wherein at least a portion of the cross-section of the top portion and the cross-section of the bottom portion is open so as to allow the passage of materials from above the top portion to below the bottom portion, wherein if separation of top portion and bottom portion occurs, the top portion and bottom portion maintain relative lateral position during separation;
injecting fluid into the separation zone of each load cell in order to apply a load to each load cell of the at least two piles incorporating load cells, wherein the top portion and bottom portion are located before casting of the pile, wherein materials for casting the pile pass through the open portion of the top portion cross-section and the open portion of the bottom portion cross-section;
measuring an effect of the applied load on the at least two piles;
determining whether the plurality of piles meets at least one design criterion for bearing the working load, wherein the determination is made based on the applied load and the measured effect of the applied load on the at least two piles.

49. The method according to claim 48, wherein one of the at least one design criterion is a factor of safety.

50. The method according to claim 48, wherein load cells are incorporated into at least 10% of the plurality of piles.

51. The method according to claim 48, wherein load cells are incorporated into at least 50% of the plurality of piles.

52. The method according to claim 48, wherein load cells are incorporated into at least 80% of the plurality of piles.

53. The method according to claim 48, wherein load cells are incorporated into at least 90% of the plurality of piles.

54. The method according to claim 48, wherein load cells are incorporated into at least 100% of the plurality of piles.

55. The method according to claim 48, wherein a resistance factor (RF) of the plurality of piles is at least 0.6.

56. The method according to claim 48, wherein a resistance factor (RF) of the plurality of piles is at least 0.9.

57. A method of providing a plurality of piles for bearing a working load, comprising: locating a plurality of piles in position in a strata for bearing a working load, wherein at least two of the piles incorporate a load cell, wherein each load cell comprises:
a top portion located below a first section of a pile; and
a bottom portion located proximate the top portion, wherein a separation zone is created such that injection of a pressurized fluid into the separation zone causes a force tending to push the top portion and the bottom portion apart, and causes the top portion to push up on the first section of the pile, wherein at least a portion of the cross-section of the top portion and the cross-section of the bottom portion is open so as to allow the passage of materials from above the top portion to below the bottom portion, wherein if separation of top portion and bottom portion occurs, the top portion and bottom portion maintain relative lateral position during separation;
injecting fluid into the separation zone of each load cell in order to apply a load to each load cell of the at least two piles incorporating load cells, wherein the top portion is annular-shaped with a u-shaped cross-section, wherein the bottom portion is annular-shaped with a cross-section shaped complementary to the u-shaped cross-section of the top portion;
wherein the top portion comprises an inner wall and an outer wall that form sides of the u-shape and a first filler material capable of withstanding high pressure that forms a first boundary of the separation zone, wherein the bottom portion comprises a second filler material capable of withstanding high pressure that forms a section boundary of the separation zone, wherein as the top portion and bottom portion separate, the inner wall and the outer wall of the top portion become additional boundaries of the separation zone;
measuring an effect of the applied load on the at least two piles;
determining whether the plurality of piles meets at least one design criterion for bearing the working load, wherein the determination is made based on the applied load and the measured effect of the applied load on the at least two piles.

58. The method according to claim 57, wherein one of the at least one design criterion is a factor of safety.

59. The method according to claim 57, wherein load cells are incorporated into at least 10% of the plurality of piles.

60. The method according to claim 57, wherein load cells are incorporated into at least 50% of the plurality of piles.

61. The method according to claim 57, wherein load cells are incorporated into at least 80% of the plurality of piles.

62. The method according to claim 57, wherein load cells are incorporated into at least 90% of the plurality of piles.

63. The method according to claim 57, wherein load cells are incorporated into at least 100% of the plurality of piles.

64. The method according to claim 57, wherein a resistance factor (RF) of the plurality of piles is at least 0.6.

65. The method according to claim 57, wherein a resistance factor (RF) of the plurality of piles is at least 0.9.

66. A method of providing a plurality of piles for bearing a working load, comprising: locating a plurality of piles in position in a strata for bearing a working load, wherein at least two of the piles incorporate a load cell, wherein each load cell comprises:
a top portion located below a first section of a pile; and
a bottom portion located proximate the top portion, wherein a separation zone is created such that injection of a pressurized fluid into the separation zone causes a force tending to push the top portion and the bottom portion apart, and causes the top portion to push up on the first section of the pile, wherein at least a portion of the cross-section of the top portion and the cross-section of the bottom portion is open so as to allow the passage of materials from above the top portion to below the bottom portion, wherein if separation of top portion and bottom portion occurs, the top portion and bottom portion maintain relative lateral position during separation;
injecting fluid into the separation zone of each load cell in order to apply a load to each load cell of the at least two piles incorporating load cells, wherein the top portion is annular-shaped with a u-shaped cross-section, wherein the bottom portion is annular-shaped with a u-shaped cross-section shape having an open end, wherein the open end of the bottom portion is positioned in the u-shaped top portion, wherein as pressurized fluid is injected into the separation zone an outer wall of the bottom portion is pushed into an outer wall of the top portion to create a seal and an inner wall of the bottom portion is pushed into an inner wall of the top portion to create a seal;
measuring an effect of the applied load on the at least two piles;
determining whether the plurality of piles meets at least one design criterion for bearing the working load, wherein the determination is made based on the applied load and the measured effect of the applied load on the at least two piles.

67. The method according to claim 66, wherein one of the at least one design criterion is a factor of safety.

68. The method according to claim 66, wherein load cells are incorporated into at least 10% of the plurality of piles.

69. The method according to claim 66, wherein load cells are incorporated into at least 50% of the plurality of piles.

70. The method according to claim 66, wherein load cells are incorporated into at least 80% of the plurality of piles.

71. The method according to claim 66, wherein load cells are incorporated into at least 90% of the plurality of piles.

72. The method according to claim 66, wherein load cells are incorporated into at least 100% of the plurality of piles.

73. The method according to claim 66, wherein a resistance factor (RF) of the plurality of piles is at least 0.6.

74. The method according to claim 66, wherein a resistance factor (RF) of the plurality of piles is at least 0.9.

75. A method of providing a plurality of piles for bearing a working load, comprising: locating a plurality of piles in position in a strata for bearing a working load, wherein at least two of the piles incorporate a load cell, wherein each load cell comprises:
a top portion located below a first section of a pile; and
a bottom portion located proximate the top portion, wherein a separation zone is created such that injection of a pressurized fluid into the separation zone causes a force tending to push the top portion and the bottom portion apart, and causes the top portion to push up on the first section of the pile, wherein at least a portion of the cross-section of the top portion and the cross-section of the bottom portion is open so as to allow the passage of materials from above the top portion to below the bottom portion, wherein if separation of top portion and bottom portion occurs, the top portion and bottom portion maintain relative lateral position during separation;
injecting fluid into the separation zone of each load cell in order to apply a load to each load cell of the at least two piles incorporating load cells,
wherein the bottom portion is located above a second section of the pile, wherein the bottom portion is attached to the second section of the pile;
further comprising:
determining a load applied to the first section of the pile and the second section of the pile;
wherein the first section of the pile and the second section of the pile are contiguous through the open portion of the cross-section of the top portion and the open portion of the cross-section of the bottom portion, wherein after injecting fluid into the separation zone, further comprising filling cracks between the first section of the pile and the second section of the pile in the portion of the pile contiguous through the open portion of the cross-section of the top portion and the open portion of the cross-section of the bottom portion;
measuring an effect of the applied load on the at least two piles;
determining whether the plurality of piles meets at least one design criterion for bearing the working load, wherein the determination is made based on the applied load and the measured effect of the applied load on the at least two piles.

76. The method according to claim 75, wherein one of the at least one design criterion is a factor of safety.

77. The method according to claim 75, wherein load cells are incorporated into at least 10% of the plurality of piles.

78. The method according to claim 75, wherein load cells are incorporated into at least 50% of the plurality of piles.

79. The method according to claim 75, wherein load cells are incorporated into at least 80% of the plurality of piles.

80. The method according to claim 75, wherein load cells are incorporated into at least 90% of the plurality of piles.

81. The method according to claim 75, wherein load cells are incorporated into at least 100% of the plurality of piles.

82. The method according to claim 75, wherein a resistance factor (RF) of the plurality of piles is at least 0.6.

83. The method according to claim 75, wherein a resistance factor (RF) of the plurality of piles is at least 0.9.

84. A method of providing a plurality of piles for bearing a working load, comprising: locating a plurality of piles in position in a strata for bearing a working load, wherein at least two of the piles incorporate a load cell, wherein each load cell comprises:

a top portion located below a first section of a pile; and a bottom portion located proximate the top portion, wherein a separation zone is created such that injection of a pressurized fluid into the separation zone causes a force tending to push the top portion and the bottom portion apart, and causes the top portion to push up on the first section of the pile, wherein at least a portion of the cross-section of the top portion and the cross-section of the bottom portion is open so as to allow the passage of materials from above the top portion to below the bottom portion, wherein if separation of top portion and bottom portion occurs, the top portion and bottom portion maintain relative lateral position during separation;

injecting fluid into the separation zone of each load cell in order to apply a load to each load cell of the at least two piles incorporating load cells, wherein the bottom portion is located above a second section of the pile, wherein the bottom portion is attached to the second section of the pile;

further comprising:

determining a load applied to the first section of the pile and the second section of the pile;

wherein the bottom portion is located above a second section of the pile, wherein the first section of the pile and the second section of the pile are contiguous around an outer perimeter of the cross-section of the top portion and an outer perimeter of the cross-section of the bottom portion, wherein after injecting fluid into the separation zone, further comprising filling cracks between the first section of the pile and the second section of the pile in the portion of the pile contiguous around the outer perimeter of the cross-section of the top portion and an outer perimeter of the cross-section of the bottom portion;

measuring an effect of the applied load on the at least two piles;

determining whether the plurality of piles meets at least one design criterion for bearing the working load, wherein the determination is made based on the applied load and the measured effect of the applied load on the at least two piles.

85. The method according to claim 84, wherein one of the at least one design criterion is a factor of safety.

86. The method according to claim 84, wherein load cells are incorporated into at least 10% of the plurality of piles.

87. The method according to claim 84, wherein load cells are incorporated into at least 50% of the plurality of piles.

88. The method according to claim 84, wherein load cells are incorporated into at least 80% of the plurality of piles.

89. The method according to claim 84, wherein load cells are incorporated into at least 90% of the plurality of piles.

90. The method according to claim 84, wherein load cells are incorporated into at least 100% of the plurality of piles.

91. The method according to claim 84, wherein a resistance factor (RF) of the plurality of piles is at least 0.6.

92. The method according to claim 84, wherein a resistance factor (RF) of the plurality of piles is at least 0.9.

* * * * *

UNITED STATES PATENT AND TRADEMARK OFFICE
CERTIFICATE OF CORRECTION

| | | |
|---|---|---|
| PATENT NO. | : 7,832,280 B2 | Page 1 of 1 |
| APPLICATION NO. | : 11/960624 | |
| DATED | : November 16, 2010 | |
| INVENTOR(S) | : John A. Hayes | |

It is certified that error appears in the above-identified patent and that said Letters Patent is hereby corrected as shown below:

Column 1,
Line 48, "cementations grout" should read --cementatious grout--.

Signed and Sealed this
Fifteenth Day of March, 2011

David J. Kappos
*Director of the United States Patent and Trademark Office*

UNITED STATES PATENT AND TRADEMARK OFFICE
CERTIFICATE OF CORRECTION

PATENT NO. : 7,832,280 B2
APPLICATION NO. : 11/960624
DATED : November 16, 2010
INVENTOR(S) : John A. Hayes Page 1 of 2

It is certified that error appears in the above-identified patent and that said Letters Patent is hereby corrected as shown below:

In the Drawings

Patent Reads:

Figure 3A:

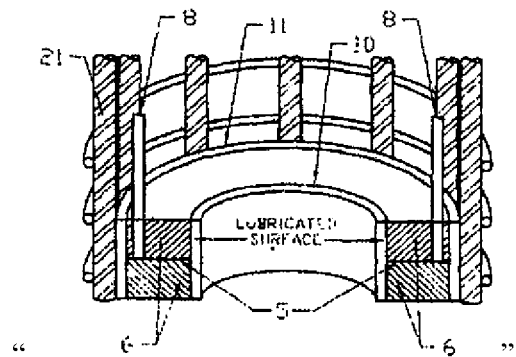

Application Should Read:

Figure 3A:

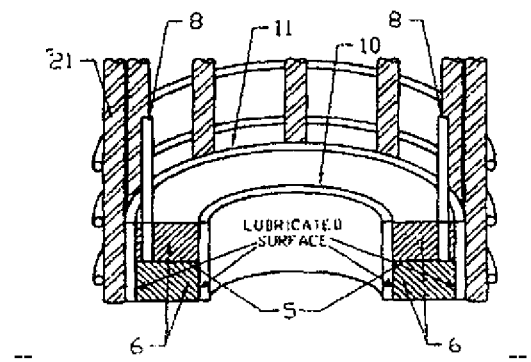

Figure 3B:

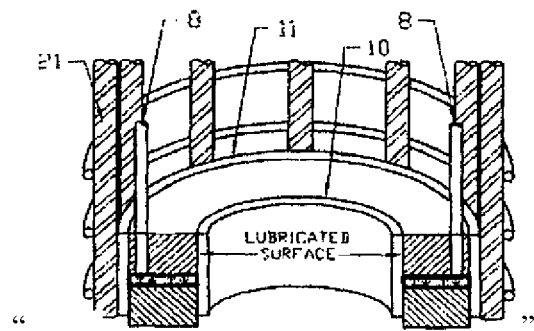

Figure 3B:

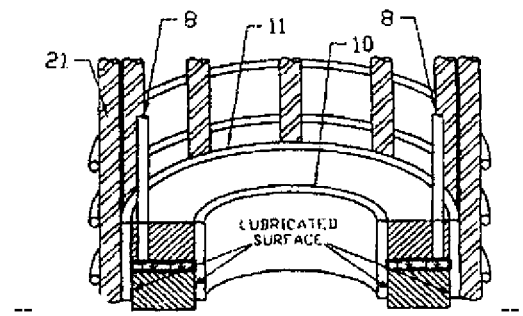

Signed and Sealed this
Thirtieth Day of June, 2015

Michelle K. Lee
*Director of the United States Patent and Trademark Office*

CERTIFICATE OF CORRECTION (continued)
U.S. Pat. No. 7,832,280 B2

Patent Reads:

Figure 3C:

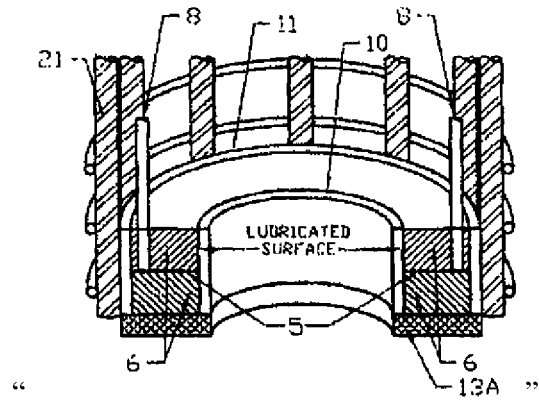

"

Application Should Read:

Figure 3C:

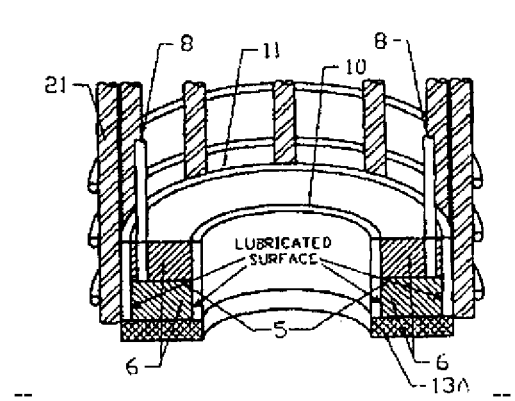

--